Figure 3:
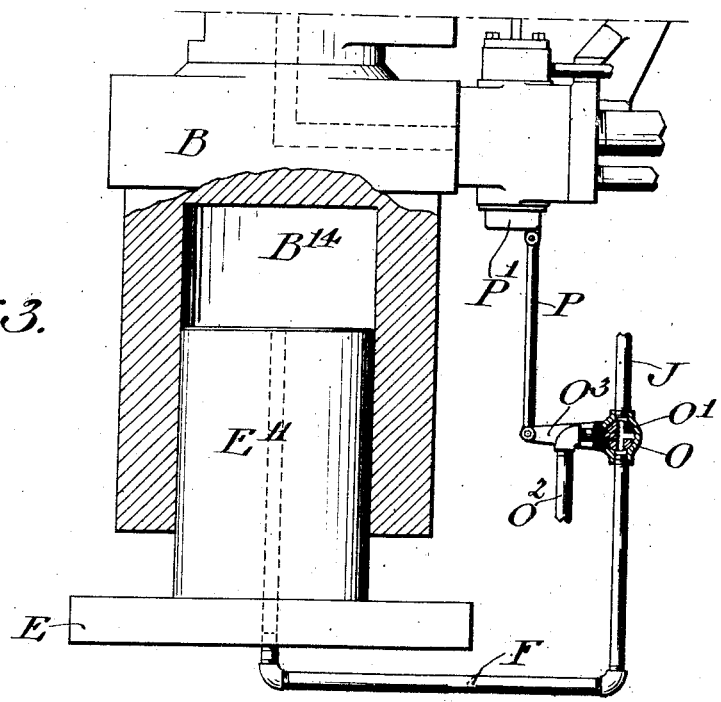

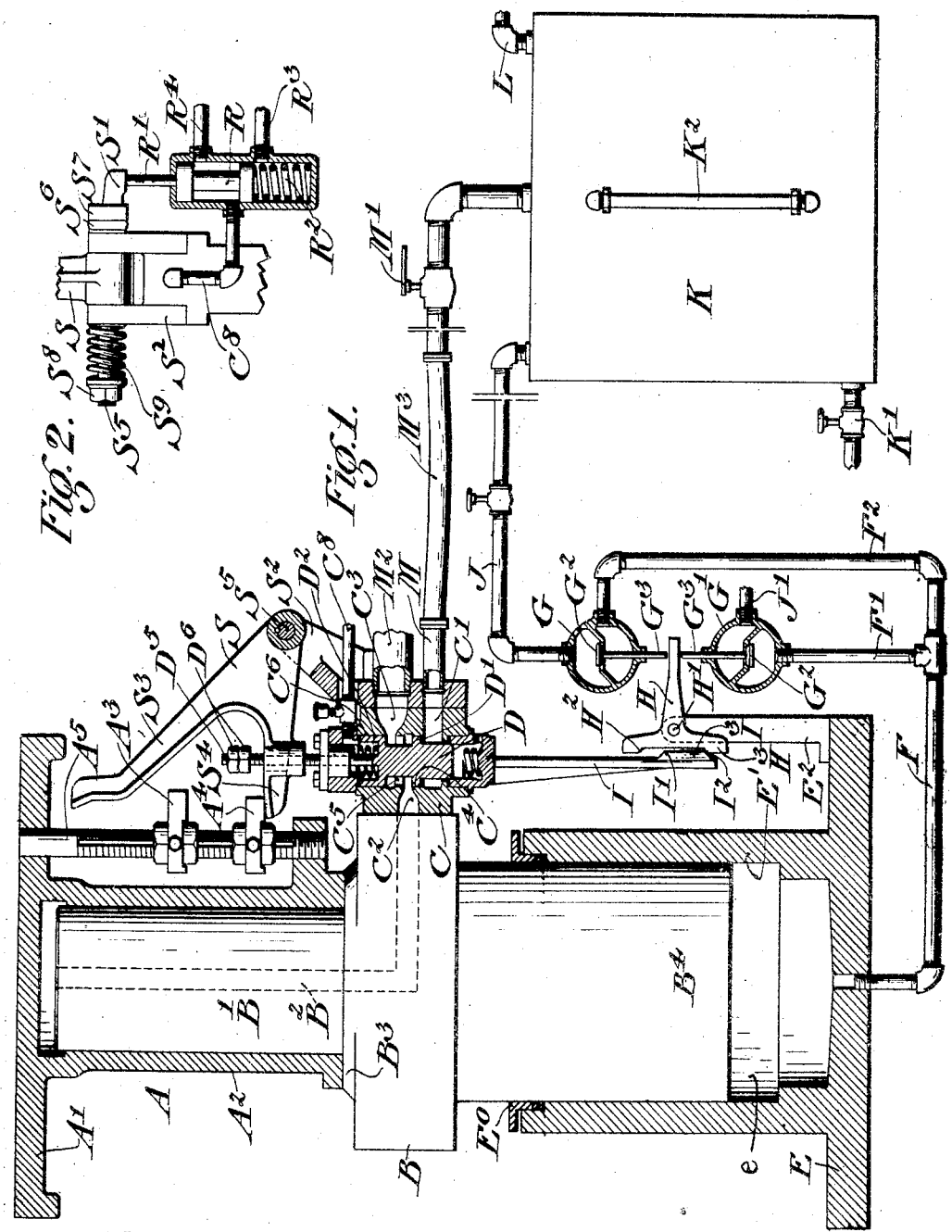

W. LEWIS.
MOLDING MACHINE.
APPLICATION FILED JULY 3, 1909.

941,999.

Patented Nov. 30, 1909.
6 SHEETS—SHEET 2.

WITNESSES:

INVENTOR

BY

ATTORNEY.

W. LEWIS.
MOLDING MACHINE.
APPLICATION FILED JULY 3, 1909.
941,999.
Patented Nov. 30, 1909
6 SHEETS—SHEET 3
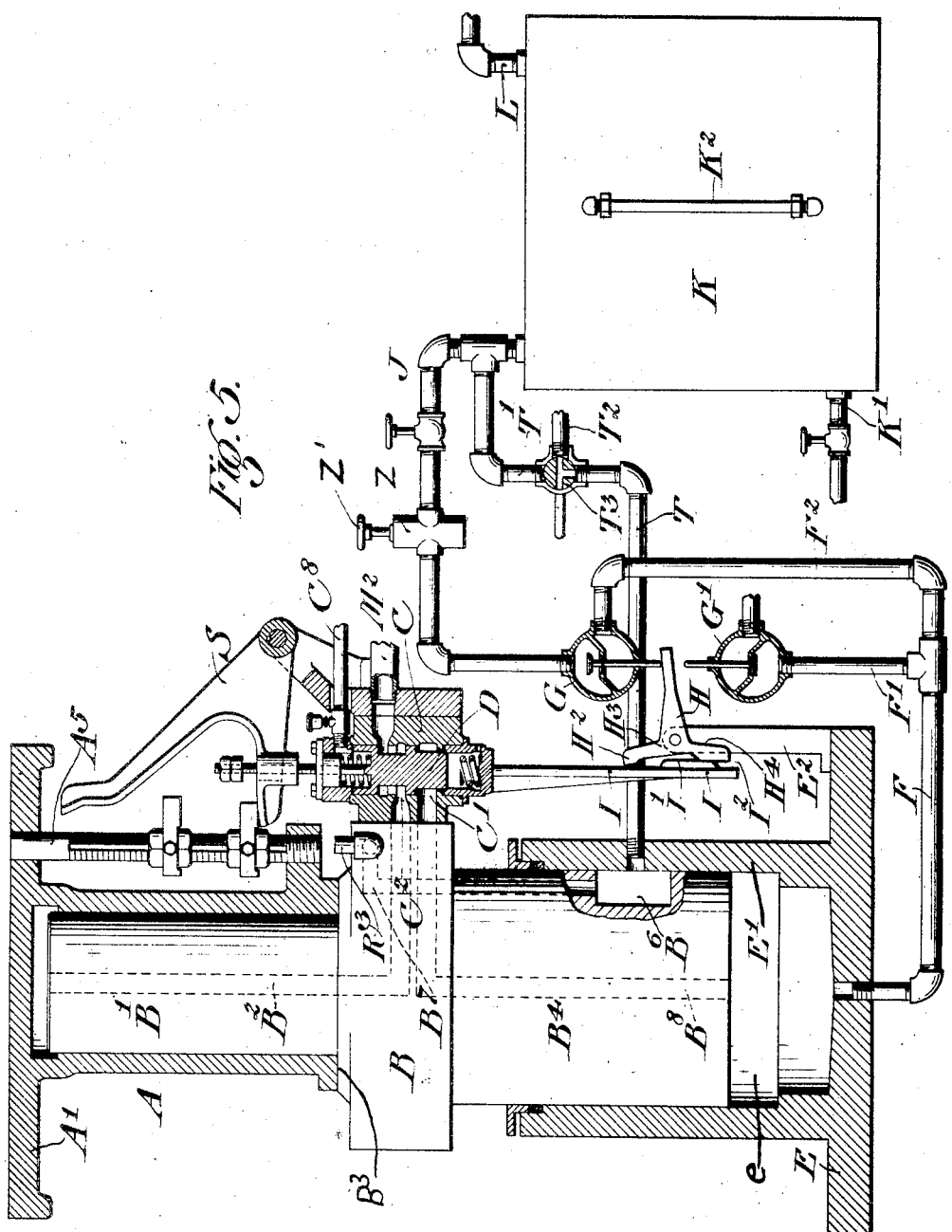

W. LEWIS.
MOLDING MACHINE.
APPLICATION FILED JULY 3, 1909.
941,999.
Patented Nov. 30, 1909.
6 SHEETS—SHEET 4.
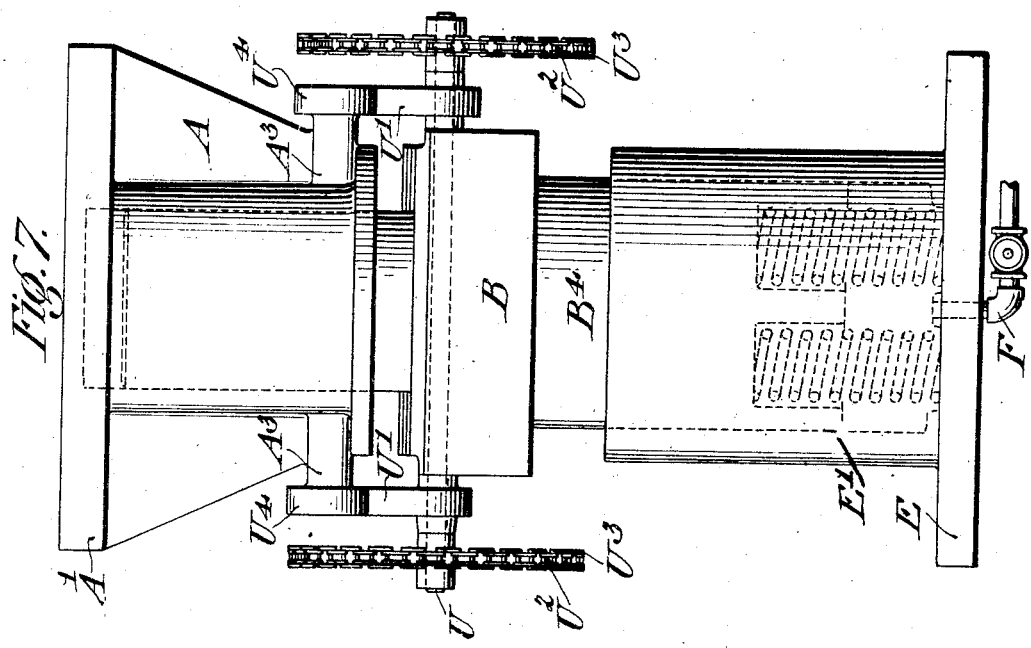
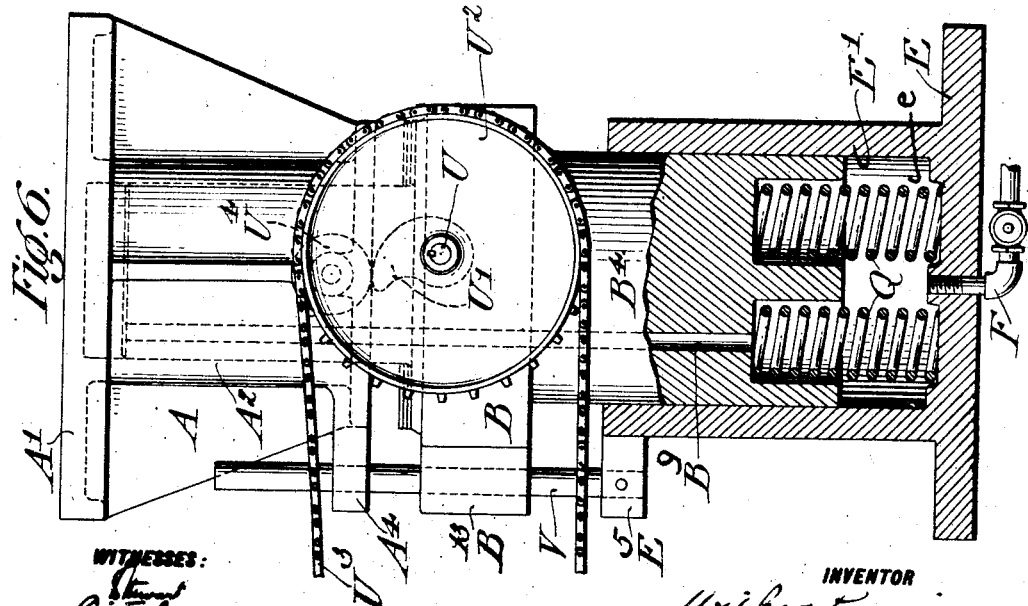

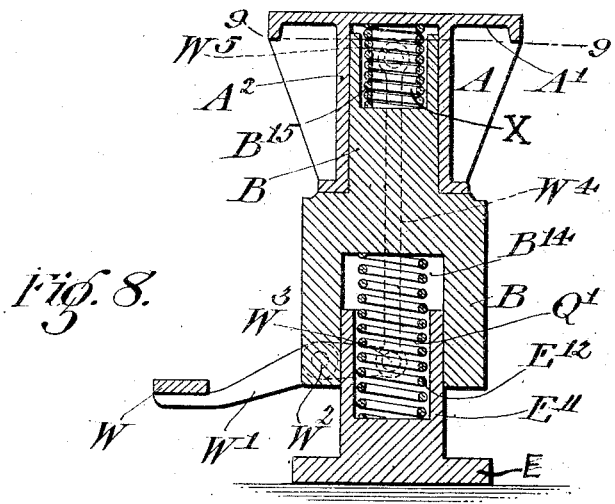
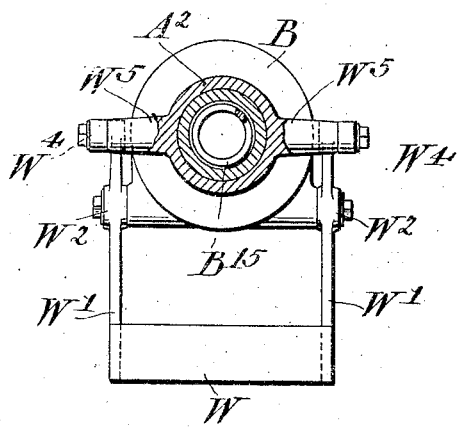

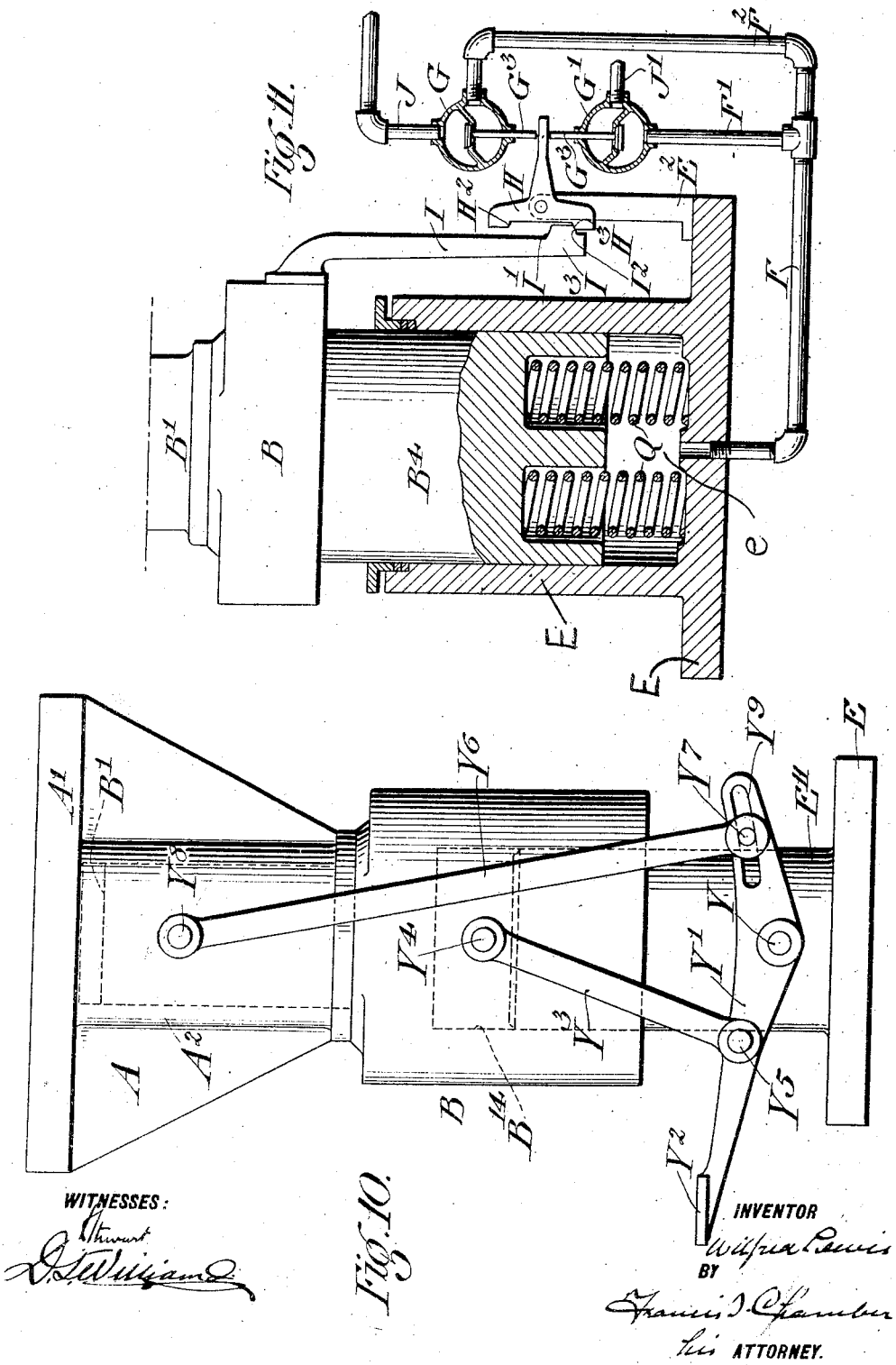

UNITED STATES PATENT OFFICE.

WILFRED LEWIS, OF PHILADELPHIA, PENNSYLVANIA, ASSIGNOR TO THE TABOR MANUFACTURING COMPANY, OF CAMDEN, NEW JERSEY, A CORPORATION OF NEW JERSEY.

MOLDING-MACHINE.

941,999.

Specification of Letters Patent.   Patented Nov. 30, 1909.

Application filed July 3, 1909.   Serial No. 505,850.

*To all whom it may concern:*

Be it known that I, WILFRED LEWIS, a citizen of the United States of America, residing in the city and county of Philadelphia, in the State of Pennsylvania, have invented a certain new and useful Improvement in Molding-Machines, of which the following is a true and exact description, reference being had to the accompanying drawings, which form a part thereof.

My present invention relates to jar molding machines of the kind in which a relatively movable mold support and anvil are employed and the sand or other mold forming material is compacted about the pattern or patterns by alternately separating the mold support and anvil and then causing them to collide—the shock or jar produced by the collision of the mold support with the anvil, settling the sand about the pattern. Molding machines of this type, in which collision is brought about by first lifting the mold support with the flask, pattern or patterns and loose sand mounted thereon, above the anvil, and then allowing the mold support to fall until it strikes the anvil, are now in extensive use, and where the conditions are favorable to their employment, they have given very general ratification. Heretofore, their field of usefulness has been limited, however, because of the difficulty in providing a satisfactory foundation for them. With the stationary anvil heretofore employed, the jar transmitted to the foundation is a severe one, as will be readily understood when account is taken of the fact that the mold support, flask, pattern, and sand supported thereby, in large machines may weigh as much as ten tons or more and that this weight is allowed to drop with substantial freedom until arrested by the anvil, through a distance of several, usually three or four, inches. Because of the jar thus transmitted to the support, it has heretofore been impossible to mount even moderate sized machines of this type directly on the upper floors of buildings. It is of course possible to use a machine of this type on the upper floor of a building if a special supporting column is run from the main foundation up through the various lower floors to the particular floor on which the molding machine is installed, but this expedient, which has been employed in practice, is expensive and unsatisfactory. Even when the molding machine is mounted on the ground, trouble has been experienced from the shaking down and destruction of previously formed molds stacked up in the vicinity of the jarring machine.

The object of the present invention is the production of a satisfactory jar molding machine of the type referred to, having suitable provisions for preventing the transmission of any injurious jars, due to the blows of the mold support against the anvil, to the support or foundation upon which the molding machine is mounted, thus making it possible to employ the molding machine in any location where the static weight of the molding machine and the flask, patterns and sand carried by the mold support can be safely supported. This I accomplish by providing a movable or floating anvil and by providing also means for giving the anvil a movement relative to the support or foundation upon which the machine is mounted, which is opposite in direction to the anvil striking movement of the mold support, and is of a velocity, at the instant of collision, such that the momentum of the anvil is comparable in amount with the momentum of the mold support and its load at that instant. Where the momentum of the anvil is exactly equal in amount, but opposite in direction, to the momentum of the loaded mold support, the momentum of each is destroyed by the other on collision. In practice, however, I sometimes prefer to give the anvil a momentum at impact slightly less than the momentum of the loaded mold support. This results, of course, in giving the anvil a slight initial velocity downward after impact, and this unbalanced portion of the momentum of the mold support is useful in quickly returning the mold support and anvil to the original position, thus increasing the rapidity of operation of the machine.

In the principal type of jar molding machine in practical use at the present time, the mold support and anvil are connected by a piston and cylinder, and the mold support is first lifted off the striking face of the anvil and then allowed to drop until its motion is again arrested by its engagement with the striking face of the anvil by the alternate admission to, and exhaust from, the cylinder of a fluid (usually air) under pressure. In consequence, the weight of the mold support and its load is sustained by the anvil, either directly or through the pressure fluid cushion, at all times except when the mold support is falling under the action of gravity to thereby acquire the momentum destroyed during impact. In a machine of the type referred to, I prefer to give the counter momentum to the anvil by mounting the latter on a resilient cushion of such a character that the weight of the anvil, mold support and load is resiliently supported or balanced at a relatively low level when the weight of the mold support and its load is carried by the anvil, while when the weight of the mold support and its load is taken off the anvil, as it is when the mold support is allowed to drop, the cushion moves the anvil to a higher level. With such an arrangement the cushion exerts an initial net effective upward force on the anvil in excess of the weight of the latter which is equal to the weight of the mold support and its load. If the effective force exerted by the cushion to move the anvil upward remains constant during the upward movement of the anvil (friction being disregarded), the velocities of the mold support and the anvil at the moment of impact will obviously be inversely proportional to their masses, and hence their momentums will be equal in amount at the instant of collision. If the cushion is of such character that the force urging the anvil upward decreases somewhat during the upward movement, the momentum of the anvil at the instant of impact will be slightly less in amount than that of the mold support, but if this portion is relatively small it is not objectionable and, as I have before indicated, may be advantageous in facilitating the rapid repetition of the sand settling impacts.

Where the anvil is given its upward velocity at the instant of impact by a resilient cushion acting between the anvil and the base of the machine or the machine support, the fact that the momentum of the anvil is not exactly equal in amount, though opposite in direction, to the momentum of the mold support and its load, at the instant of collision does not result in transmitting any portion of the shock of collision, properly speaking, to the support for the molding machine. Of course in such cases the anvil is given a downward impulse at the instant of impact, and this must be checked either by increasing the tension of the cushion or otherwise, by the time when the anvil returns to the desired lower level, but when this downward impulse of the anvil is checked by an increase in the tension of the cushion, the increase of the load on the support for the molding machine as a whole, due to the increase in the tension of the cushion, takes place gradually and does not partake of the nature of a jar or blow.

The resilient cushion which I prefer to form may be formed by springs, preferably coiled steel springs, by an elastic fluid, as air, under pressure, or in part by a compressed body of air or like fluid and in part by springs. Other resilient cushions can also be employed to give the anvil the desired upward velocity at the instant of impact.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described several of the many forms in which my invention may be embodied.

Figure 4:
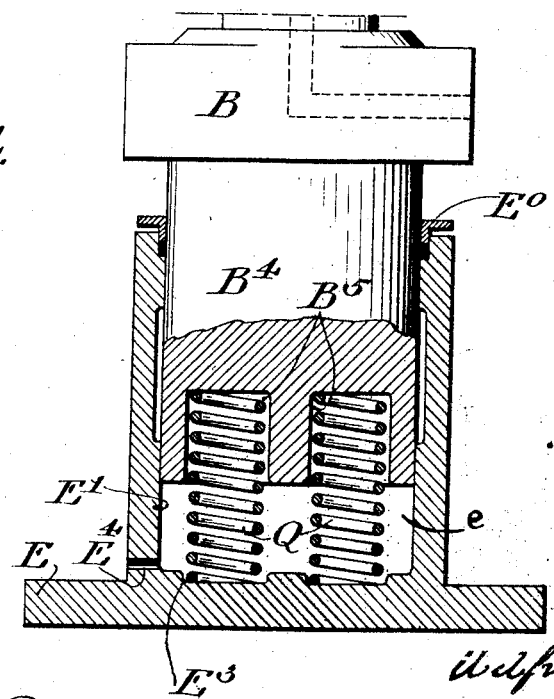

Of the drawings, Figure 1 is a sectional elevation of a molding machine embodying my invention, and a somewhat diagrammatic representation of a portion of the fluid pressure supply pipes and valves therefor. Fig. 2 is an elevation, taken at right angles to Fig. 1, and partly in section, showing a portion of the valve mechanism which may be employed with the apparatus of Fig. 1. Fig. 3 is a view taken similarly to Fig. 1, showing a slightly modified form of molding machine. Fig. 4 is also a view taken similarly to Fig. 1, showing a third form of molding machine. Fig. 5 is a view taken similarly to Fig. 1, showing a different form of fluid pressure controlling mechanism. Fig. 6 is an elevation, partly broken away and in section, of a molding machine embodying my invention, in which power actuated mechanism other than fluid pressure mechanism is employed for lifting the mold support off the anvil. Fig. 7 is an elevation, taken at right angles to Fig. 6. Fig. 8 is a sectional elevation of a manually actuated molding machine embodying one form of my invention. Fig. 9 is a sectional plan on the line 9—9 of Fig. 8. Fig. 10 is a side elevation of a second type of manually actuated molding machine embodying a form of my invention, differing from those shown in the other figures of the drawings, and Fig. 11 is an elevation, partly broken away and in section, showing a molding machine equipped with a form of my invention in which the anvil floating cushion is formed in part by springs and in part by compressed air.

In the drawings, and referring first to the construction shown in Fig. 1, A represents the mold support which is formed at its upper end with a table A' on which the patterns, flask and mold forming material are placed, and the latter is compacted by jarring the table.

B represents the anvil, and E the base of the molding machine. The anvil and mold support are formed, one with a piston and the other with a cylinder in which the piston works. In the form shown, the cylinder $A^2$ is formed on the mold support, and the piston $B'$ is an integral portion of the anvil. A port $B^2$ formed in the anvil, is open at the upper end of the piston $B'$ to the space in cylinder $A^2$, and is in communication at its other end with the interior of a valve casing C secured to the side of the body of the anvil B. The valve mechanism in the casing C is arranged to permit of the alternate admission of the pressure fluid to, and its exhaust from, the cylinder space in the cylinder $A^2$. When this pressure fluid is admitted the mold support is lifted the proper distance above that shown in Fig. 1, and when the pressure fluid is permitted to exhaust, the mold support drops under the action of gravity until its motion is arrested by the engagement of the lower end of the cylinder $A^2$ with the striking face $B^3$ of the anvil. The valve mechanism in casing C may be of any suitable character and may be automatic or non automatic, and the specific character of this valve mechanism forms no part of the invention claimed therein. I have illustrated this valve mechanism in some detail, however, though in a somewhat diagrammatic way, in order that a proper understanding of the operation of a concrete embodiment of the invention may be had. In the embodiment illustrated, the valve casing C is provided with an inlet chamber C' intended to be connected to a source of pressure fluid by a pipe M; an exhaust chamber $C^3$ connected to an exhaust pipe $M^2$, and an intermediate chamber $C^2$ in communication with the port $B^2$. Pipe M should be flexible or should have a flexible portion $M^3$ as shown. Valve controlled ports $C^4$ and $C^5$ connect the chamber $C^2$ with the chambers C' and $C^3$, respectively. A valve member D is provided with piston portions D' and $D^2$ which control the ports $C^4$ and $C^5$, respectively. These piston portions are so arranged that when the valve is in the position shown, the port $C^4$ is closed and the port $C^5$ is open, and when the valve member is depressed, the port $C^5$ is closed and port $C^4$ is opened. The piston portion $D^2$ is elongated and projects at all times into a chamber $C^6$ in the valve casing C. It will be observed that the fluid pressure acting on the valve D in the chambers C', $C^2$ and $C^3$ tend to hold the valve in the position shown in which the port $C^4$ is closed. The valve D is alternately moved out of, and allowed to return to, the position shown by the admission to and exhaust from the chamber $C^6$ of fluid under pressure admitted through the pipe $C^8$. In the form shown, the admission to, and exhaust from, the chamber $C^6$ is controlled by a pilot valve R (see Fig. 2) which serves to alternately connect the pipe $C^8$ with a supply pipe $R^3$ connected to pipe M, and with an exhaust pipe $R^4$. The stem $R^1$ of the pilot is adapted to be engaged and depressed against the action of the spring $R^2$ by a lateral extension S' from the bell crank lever S. The lever S is mounted in a bracket $S^2$ secured to the casing of the valve C, and is provided with two arms $S^3$ and $S^4$ adapted to be alternately engaged as the mold support reaches the upper and lower limits of its movement with respect to the anvil by collars $A^3$ and $A^4$ adjustably mounted on a rod $A^5$ carried by the mold support and extending parallel to the axis of the cylinder A'. The lever S is keyed to its pivot pin $S^5$. A friction washer $S^6$ is inserted between the head $S^7$ of the pivot pin and the adjacent side of the bracket $S^2$, and a helical spring $S^9$ is placed around the opposite end of the pin $S^5$ between the nut $S^8$ and the adjacent side of the bracket $S^2$. The spring and frictional washer arrangement described form frictional means for holding the lever S in either position in which it is moved by the stops $A^3$ and $A^4$ until the lever is positively moved in the opposite direction. To guard against an excessive movement of the mold support A away from the face $B^3$ of the anvil, the valve D is provided, as shown, with a stem $D^5$ which passes through a slot formed in the arm $S^4$, and carries nuts $D^6$ at its upper end which are engaged by the arm $S^4$ when the lever S is given a movement slightly in excess of that required to throw the valve R into the position in which it connects the pipe $C^8$ to exhaust. When this engagement takes place, the valve D is positively shifted to connect the cylinder space $A^2$ to exhaust. Cushion springs $D^3$ and $D^4$ are provided in the valve casing C for cushioning the movement of the valve member D.

The valve mechanism described for controlling the admission to and exhaust from the cylinder space of the mold support of the working fluid, possesses certain features of novelty which are not claimed herein as they form the subject matter of my copending application, Serial No. 501,133, filed June 9th, 1909.

To avoid the transmission of shock, which is the object of the present invention, the anvil B and support E are connected by a piston and cylinder arrangement. In the form shown in Fig. 1, the anvil is formed at its lower end with a piston $B^4$, and the support E with a hollow cylinder E' in the cylinder space or chamber $e$ in which this piston works, and means are provided for introducing fluid under pressure to the chamber $e$. A stuffing box $E^0$ is provided at the upper end of the cylinder E' to prevent leakage. The means shown for introducing the pressure fluid comprise a pipe F which opens into the bottom of the chamber $e$ and is formed with branches F' and F². The branch F' runs to the inlet chamber of a valve G', and the branch F² runs to the outlet chamber of the valve G. The valves G and G', in the somewhat diagrammatic form illustrated, are identical in construction, the valve members proper G² being seated by the pressure of the fluid in the inlet chamber of the valves, and being provided with stems projecting through the valve casings by which the valves G² may be moved off their seats when the valve stems are pushed in. In the form shown the valve stems G³ of the two valves G and G' are arranged in line with and facing each other, and are alternately engaged by a lever H pivoted at H' and provided with cam surfaces H² and H³ adapted to be engaged by the similar but oppositely disposed cam surfaces I' and I² of the cam lug I³ carried by the bracket secured to the underside of the valve casing C. The pivot pin H' of the lever H is carried by a bracket E² secured to the base member E. The inlet port of the valve G is connected by a pipe J to the upper end of an air reservoir or water and air separating receptacle K provided with a blow-off cock K' at its lower end, water level indicator K², and a compressed air supply pipe L. The outlet port of the valve G' is connected to an exhaust pipe J'. The pipe M may also be connected to the tank K.

With the arrangement described, when the anvil B reaches the level shown in Fig. 1, the cam surface I² engages the cam surface H³ of the lever H, and any further downward movement of the anvil causes the lever H to turn on its pivot pin H', and engage and open valve G and thereby admit compressed air from the receptacle K, through pipe J, valve G, branch pipe F² and pipe F, to the lower end of the cylinder space e. When, on the other hand, the upward movement of the anvil is such as to cause the cam surface I' to engage the cam surface H² of the lever H and turn lever H to open the valve G', the cylinder space e is connected to exhaust through pipe F, branch pipe F', valve G', and exhaust pipe J'. In operation, therefore, the valves G and G' serve on the one hand to admit compressed air to the space e whenever necessary to prevent the anvil B from moving below the position shown in Fig. 1, and to exhaust air from the chamber e to prevent the anvil from moving appreciably above the position in which the cam surfaces I' and H² engage, and this regardless of the varying weight of the anvil and load carried by it due to the alternate imposition on and removal from the anvil of the weight of the mold support A and the varying load mounted on the table A² thereof.

In forming a mold, the flask, patterns and mold forming material is placed on the table A² with the apparatus in the position shown, and with the valve M' controlling the passage of the pressure fluid through the pipe M to chamber C' of valve casing C from the reservoir K in the closed position. After the flask, pattern and mold forming material are in place, the valve M' is opened. This admits pressure fluid to the chamber C' of the valve casing C, and through the pilot valve R to chamber C⁶. From chamber C' the air passes to the space in the cylinder A², for the valve R is initially, of course, in the position in which valve D leaves the port C⁴ open. This raises the mold support A with its load until it reaches the desired upward limit of its movement relative to the anvil when the lug A³ engages the arm S³ of the bell crank lever controlling the pilot valve R, and the latter is thereby shifted to connect the chamber C⁶ of the valve casing C to exhaust. The valve D then moves to close port C⁴ and open port C⁵, whereupon the mold support with its load falls freely under the action of gravity until it engages the striking face B³ of the anvil and is arrested thereby. At this instant the stop A⁴ engages the lever arm S⁴ of the pilot valve controlling lever, and moves the pilot valve R to admit compressed air to the chamber C⁶, whereupon the valve D is depressed and port C⁴ opened and port C⁵ closed. This action is repeated so long as the valve M' is left open, with a consequent rising and falling movement of the mold support relative to the anvil. When the mold forming material has been sufficiently compacted about the pattern, the valve M' is closed and the rising and falling movement of the mold support relative to the anvil ceases. During the initial rising movement of the mold support relative to the anvil, the latter remains practically stationary, as the load transmitted to it by the mold support through the fluid pressure cushion in the space in cylinder A² is practically the static weight of the mold support and its load. When, however, port C⁵ is opened and the mold support is free to fall under the action of gravity, the tension of the air in the space in cylinder A² instantly falls, approaching the atmospheric pressure, and the weight of the mold support and its load is then taken off the anvil. The compressed air in the cylinder e then expands and moves the anvil up. The force exerted by the compressed air against the piston B⁴ of the anvil in excess of the weight of the anvil, is at the start exactly equal to the weight of the mold support and its load which was supported by the air cushion in the cylinder space e prior to the instant when the mold support begins to fall. If the friction were negligible and if the tension of the air under pressure in the cylinder space e were to remain constant during the upward movement of the anvil, the upward velocity acquired by the anvil at the instant of collision with the mold support would bear the same relation to the velocity of the mold support as the reciprocal of the weight of the mold support and its load bears to the weight of the anvil. Under such conditions the momentum of the anvil would be exactly equal to the momentum of the mold support and its load at the instant of impact.

If friction retards the upward movements of the piston B⁴ and its support, and if the pressure of the air in the space e decreased somewhat with the upward movement of the anvil, as is the case with the apparatus shown in Fig. 1, the upward velocity of the anvil is correspondingly decreased and the momentum of the anvil at the instant of impact is somewhat less than the momentum of the mold support. The effect of friction between the anvil and its support opposing their relative movements is to cause the transmission of a portion of the shock of collision to the anvil support. The shock thus transmitted corresponds to double the amount of the friction, for at the instant of impact the direction of movement of the anvil and the direction of the frictional pull exerted by the anvil on the anvil support are reversed. Some frictional retardation may be advantageously employed, however, for the purpose of damping out secondary oscillations of the anvil. It will be readily understood, of course, that after collision, the anvil should be returned to the original position before the mold support is raised or while it is being raised preparatory to the next drop, and where the momentum of the mold support at collision is in excess of that of the anvil, the excess insures an initial downward impulse to the anvil which may be relied on to return it to its lower level. Where the pressure in the chamber e falls and rises with the up and down movement of the anvil, the latter will be driven slightly below the initial position except in so far as its movement is impeded by friction, but this excess of downward movement is compensated for by the slightly higher velocity acquired by the anvil at the following instant of collision and, disregarding friction, the effectiveness of the shock of collision is substantially the same whether the air pressure in cylinder space e varies with the movement of the anvil, or not. As a matter of fact, in practice, the movement of the anvil is comparatively small and the volume of the air cushion when the anvil is in its lowest position can easily be made great enough to prevent any very great variation in the pressure of the air cushion.

In a molding machine of the type described, the sand compacting effect of collision is dependent upon the sudden change in velocity of the sand produced by collision. With my invention, where the momentum of the mold support and its load is substantially equal, but opposite in direction, to the momentum of the anvil at collision, the total actual velocity of the mold support is destroyed in collision, and hence the effectiveness of collision in compacting the sand is dependent on the actual velocity of the mold support at the beginning of collision. Where, as in the forms of the invention disclosed, the force acting on the anvil to move it upward prior to collision is the same as that acting on the mold support and load to cause their downward movement, with a fixed extent of movement of the mold support relative to the anvil, the actual velocity of the mold support at the beginning of collision varies with, though not in direct proportion to, variations in the weight of the anvil. In consequence, under these conditions, the effectiveness of the machine will increase with an increase in weight of the anvil and in practice I consider it desirable in all cases to make the anvil at least as heavy as the mold support and the maximum load impressed upon it.

Instead of forming the anvil with the piston, and the base with the cylinder, as shown in Fig. 1, it is of course obvious that the anvil may be formed with a cylinder and the base with a piston, and in Fig. 3 I have illustrated a construction in which the lower portion of the anvil is formed with a piston chamber B¹⁴ and the base E is formed with a coöperating piston E¹¹. The operation of the apparatus thus described is obviously the same in minimizing the transmission of shock to the base of the cylinder as in the construction shown in Fig. 1.

In the construction shown in Fig. 3, I have shown a means for connecting the pipe F either to the discharge pipe O² or to a compressed air pipe J which comprises a single rotary three-way cock O' mounted in a casing O and provided with a lever arm O³ connected to a bracket P' secured to the valve casing C by a link P.

In Fig. 4 I have illustrated a construction in which the resilient cushion is formed by steel springs instead of compressed air. In the particular form of construction illustrated, the piston B⁴ of the anvil is formed at its lower end with a plurality of vertical sockets B⁵ in each of which is received the upper end of a corresponding helical spring Q, the lower end of which spring is received in a corresponding socket E³ in the portion of the base member E forming the bottom wall of the space e. The resilient cushion formed by the springs Q is capable of performing the same function as the compressed air cushion in giving the upward movement to the anvil when the weight of the mold support and its load is taken off of it to thereby prevent the transmission of the shock of collision to the base E. There are, however, certain differences in operation between the air cushion and the steel spring cushion, and each cushion presents certain advantages and disadvantages, as compared with the other cushion, which may make it desirable to use the one cushion in some cases and the other cushion in other cases. In some cases also, as hereinafter explained, a resilient cushion, formed partly by springs and partly by compressed air, may be advantageously employed. Where the steel spring cushion is used there is of course a saving of the compressed air, used in floating the anvil where the compressed air cushion is employed. With the steel spring cushion also, the valves and piping for supplying and controlling the air cushion are dispensed with. Where the steel spring cushion is employed there is of course an appreciable decrease in the tension of the springs at the instant of collision from that existing when the anvil, mold support and load are stationary and are balanced by the springs. The decrease in the tension of the springs when the anvil moves from its lower position to its upper position may be reduced, of course, by increasing the length of the springs, but for practical reasons it is not possible to greatly vary the lengths of the springs. I consider it desirable in all cases to have the springs long enough so that the compression of the springs with the maximum weight impressed on them shall somewhat exceed twice the maximum drop of the anvil, and in practice it is hardly feasible to use springs in which the maximum compression is more than three or four times as great as the maximum movement of the anvil. With the compressed air cushion, on the other hand, it is readily possible to make the cylinder space occupied by the air cushion when the anvil is at its lowest position, great enough, or to connect this space with a reservoir of such capacity, that the change in volume of air under pressure occurring on the upward movement of the anvil is quite small, with a corresponding small change in pressure. Moreover, I have hereinafter described an arrangement in which means are provided for maintaining the pressure of the air cushion practically constant during almost the entire upward stroke of the anvil. With the long steel springs, variations in the weight of the mold support and its load cause substantial variations in the height of the anvil and mold support when they are at rest. These variations can be easily avoided with the air cushion, which is desirable, of course, for there is usually some one level for the mold support which is more convenient than any other level for putting on the flask, patterns and mold forming material and removing the mold.

While the variations in the tension of the cushion, whether it be a compressed air cushion or a steel spring cushion, results in a variation in the pressure exerted by the base member of the machine against the foundation, it will be understood that these variations are not instantaneous but are in the nature of pulsations, the change in the pressure exerted by the base member of the machine against the foundation varying practically uniformly throughout the movement of the anvil from its lower to its upper position, and vice versa. The stuffing box $E^0$, when used with the steel springs of Fig. 4, is not to prevent air leakage but simply as a brake to damp out secondary vibrations of the anvil, and by suitably regulating the size of the port $E^4$ through which air flows into and out of the cylinder space $e$, any stuffing box or other frictional brake connection between the anvil and the base member may be dispensed with.

In the arrangement shown in Fig. 5 I have provided means for maintaining the tension of the compressed air cushion practically uniform throughout the operation of forming a single mold. In this form of my invention an automatic pressure reducing valve Z is provided in the pipe J which should be set at the beginning of each mold forming operation to maintain a pressure at the outlet side of the valve exactly equal to the tension of the compressed air in the cylinder space $e$ necessary to support the weight of the anvil, the mold support and the load carried by the latter. I have not thought it necessary to illustrate the details of the construction of the automatic pressure reducing valve Z, as such valves are in common use. It will be sufficient to say that the valve may be adjusted to maintain different pressures at its outlet side by turning the hand wheel $Z'$. In this form of my invention the valve G is open and is in free communication with the outlet side of the valve Z during nearly the entire range of movement of the anvil. To bring this about I have arranged the lever H with a bearing surface $H^4$ against which the face of the lug $I^3$ bears during the major portion of the normal up and down movement of the anvil. The cam surfaces $H^2$ and $H^3$ of the lever H are located above the surface $H^4$, and these surfaces $H^2$, $H^3$ and $H^4$ are so arranged relative to the face and inclined sides $I'$ and $I^2$ of the lug $I^3$, that the lever H will be shifted to permit valve $G^2$ to close, and open valve $G'$ only when the anvil approaches closely to the desired upward limit of its movement. In consequence of this arrangement the pressure in the chamber $e$ remains constant during the major portion of the upward movement of the anvil occurring during the falling movement of the mold support.

With the apparatus shown in Fig. 5 I take the air for producing the relative movement between the mold support and the anvil from the chamber $e$. To accomplish this I have formed a channel $B^8$ in the anvil which extends from the lower end of the piston $B^4$ to the inlet chamber $C'$ of the valve casing $C$. In consequence, when the mold support engages the striking face $B^3$ of the anvil, and the valve is moved to put chamber $C'$ into communication with the chamber $C^2$, the air from the chamber $E'$ passes into the space in the cylinder $A^2$ above the piston $B'$ to raise the mold support off the anvil.

Where the air for raising the mold support off the anvil is taken from the chamber $e$, as in Fig. 5, it is of course essential that the ratio between the areas of the piston $B^4$ and $B'$ should somewhat exceed the ratio of the combined weight of the anvil, mold support and maximum load thereon to the combined weight of the mold support and its maximum load.

With the apparatus shown in Fig. 5, the relatively large volume of air which must be permitted to escape from the space $e$ in order to permit the proper downward movement of the anvil after collision is utilized, as described, in producing the desired relative movement between the anvil and the mold support. In order to obtain the desired rapidity of downward movement of the anvil following collision, with the apparatus shown in Fig. 5, it is desirable to so arrange the lever $H$ relative to the lug $I^3$, that the valve $G'$ will open slightly prior to collision, and hence slightly reduce the pressure in the chamber $e$ at the instant of collision, the consequent slight preponderance of the momentum of the mold support over that of the anvil at the instant of impact gives the anvil the slight downward impulse after collision necessary for successful operation.

By taking air from the space $e$ in the manner shown in Fig. 5, I avoid the use of the flexible pipe section $M^4$ of Fig. 1 between the inlet port $C'$ of valve casing $C$ and the source of fluid pressure, and I can also dispense with any flexible pipe connection to the pilot valve $R$ by connecting the pipe $R$ to a channel $B^7$ formed in the piston $B^4$ terminating in a pocket $B^6$ in the side of the piston which is at all times in communication with the supply pipe $T$. The latter pipe may be connected either to exhaust $T^2$ or to a pressure fluid supply pipe $T'$ through a hand operated valve $T^3$. Avoidance of flexible connections, however, while advantageous in some cases, is not usually a matter of importance, and as I have indicated before, there is ordinarily but little advantage obtained by admitting air to the cylinder $E'$ during the rising movement of the anvil.

The invention can of course be applied to a molding machine in which the mold support is lifted off the anvil by other means than fluid under pressure, and in Figs. 6 and 7 I have shown the invention applied to a molding machine in which a novel arrangement of parts is provided for lifting the mold support off the anvil through mechanical connections. In this form of the apparatus the anvil has journaled in it a transverse shaft $U$ carrying cams $U'$ at opposite sides of the anvil. The shaft $U$ has secured to one, or preferably to each end, as shown, a wheel $U^2$, engaged by a driving belt or chain $U^3$. The mold support $A$ is provided with lateral bosses $A^3$ at the ends of which are journaled cam rolls $U^4$ adapted to be engaged by the cams $U'$. With this construction the rotation of the shaft $U$ causes the cams $U'$ to alternately lift the mold support off the anvil when the high portions of the cams $U'$ engage the rolls $U^4$, and to permit the mold support to drop when the high portions of the cams pass out from under the rolls $U^4$.

In the particular apparatus shown in Figs. 6 and 7, springs $Q$ arranged as shown in Fig. 4, are provided to resiliently support the anvil. In the form of apparatus shown in these figures, the necessity of any stuffing box or other frictional braking device for damping out the oscillations of the anvil is avoided by providing a somewhat restricted port $B^9$ leading from the cylinder space $e$ to the space in the cylinder $A^2$. In consequence, air passes from the cylinder space $e$ into the space in cylinder $A^2$ when the mold support is raised and passes back again into the cylinder space $e$ when the mold support falls. The air, which thus flows back and forth through the port $B^9$, assists, also, in giving the desired movements to the anvil and mold support. At the same time the compression of air in the space in the cylinder $A^2$ when the mold support is falling, retards the falling movement of the mold support to some extent, and this is, generally speaking, a desirable feature, for when the mold support falls freely, with the full acceleration due to gravity, the sand does not bear as firmly against the pattern during the falling movement of the mold support, as is desirable, particularly with some classes of work. Of course the retardation of the falling movement of the mold support decreases the effectiveness of the collision, and no advantage is gained by checking the velocity just prior to impact, but a decrease in the downward velocity of the mold support throughout the falling movement and not merely at the lower end, is a substantial advantage in some cases.

With the arrangement shown in Figs. 6 and 7 the alternate increase and decrease of the air pressure in the chamber $e$ and in the chamber of cylinder $A^2$ above the anvil piston tends to give the anvil an excess of momentum over that of the mold support at collision. But some difference in the anvil and mold support momentums in either direction is of no great importance. Where the anvil has the most momentum at collision the elevation of the mold support preparatory to the following collision is facilitated. Where the secondary oscillations of the anvil are damped by regulating the flow of air through a restricted port as the port $B^9$, there is no transmission of shock due to the damping of the oscillations as there is when the oscillations are damped by friction between the anvil and the support of the machine.

It will of course be understood that the use of the mechanical connections shown in Figs. 6 and 7 for lifting the mold support off the anvil does not prevent the use of any of the other forms of cushion described herein for floating the anvil. With the exact structure shown in Figs. 6 and 7, when compressed air of the proper tension is admitted through the valved pipe F the springs Q may be dispensed with, provided the cross sectional area of the piston $B'$ is made substantially less in proportion to weight of the mold support than the cross sectional area of the piston $B^4$ to the combined weight of the anvil and mold support.

In Fig. 6 I have shown means comprising ears $A^4$, $B^{13}$ and $E^5$ on the mold support A, anvil B, and base member E, respectively and a vertical rod V secured in the ear $E^5$, and sliding through the ears $B^{13}$ and $A^{14}$ for preventing rotation of any one of the members A, B, or E relative to the other. Some provision such as this, for preventing rotation between these parts, should be employed, it will be understood, in all of the various features of apparatus disclosed.

In some cases it is thought desirable to use manually actuated jar molding machines in order to avoid expense in the construction and installation of molding machine, or because no source of power is available, or for other reasons, and in Figs. 8 and 9 I have shown one form, and in Fig. 10, a second form, of a manually actuated jar molding machine, in which some features of my present invention are utilized. In the machine shown in Figs. 8 and 9, the anvil B is provided with a cavity $B^{14}$ in which the piston extension $E^{11}$ of the base member E is received. A cavity $E^{12}$ is formed in the upper ends of the piston $E^{11}$, and a spring $Q'$ is placed in this cavity with its lower end resting on the bottom of the cavity and the upper end bearing against the upper end of the cylinder space $B^{14}$. Similarly, a cavity $B^{15}$ is formed in the piston extension $B'$ of the anvil and the spring X resting on the bottom of this cavity has its upper end engaged by the mold support. The function of the spring X is to partially, but not entirely, take the weight of the mold support and its load off the striking face $B^3$ of the anvil. A treadle W has its lever arms $W'$ pivotally connected at $W^2$ to the opposite sides of the anvil. The short ends of the levers $W'$ are pivotally connected at $W^3$ to the links $W^4$. The upper ends of these links are pivotally connected to diametrically opposing trunnions $W^5$ projecting from the cylinder $A^2$ of the mold support. When the outer end of the treadle W is depressed, the mold support is lifted off the anvil and when the outer end of the treadle is allowed to rise the mold support drops into engagement with the anvil. It will, of course, be apparent that in this construction the spring $Q'$ serves to give the anvil an upward velocity at the moment of impact which performs the desired function of minimizing the effect on the base member E of the shock of collision between the mold support and the anvil. The provision of the counterbalancing spring X, of course, reduces the shock of collision and thereby reduces the extent to which the sand is compacted about the pattern at each collision. On the other hand, the provision of the counterbalancing spring X makes it possible to operate molding machines of this type in which the weight of the mold support, pattern, flask and sand is entirely too great to permit the manual actuation of the machine without some counterbalancing arrangement. As explained above, the reduction in the velocity with which the mold support falls when allowed to fall, is in itself an advantage under some circumstances.

The avoidance of any transmission of the shock of collision to the support of the molding machine may be also obtained where other means than a resilient cushion is employed for causing the necessary upward velocity at the instant of impact, and in Fig. 10 I have illustrated one type of apparatus of this character in which no resilient cushion is employed. In the construction shown in Fig. 10 the mold support is provided with a cylinder $A^2$, and the anvil B with a piston $B'$, by which the mold support and the anvil are guided in their relative movements, and the anvil is provided with a cavity $B^{14}$, and the base member E with a piston $E^{11}$, by means of which the anvil and base are guided in their relative movements. The base member is provided with diametrically opposed trunnions Y, on which are journaled lever arms $Y'$ of an operating treadle lever $Y^2$. Links $Y^3$ are connected at their upper ends to trunnions $Y^4$ projecting at diametrically opposed points from the anvil B. The lower ends of the links $Y^3$ are pivotally connected to the levers $Y'$ at points $Y^5$ between the trunnions Y and the point where power is applied to the levers $Y'$. At the opposite side of the trunnions Y, links $Y^6$ are pivotally connected by bolts $Y^7$ to the levers $Y'$. The upper ends of the links $Y^6$ are journaled on trunnions $Y^8$ extending at diametrically opposed points from the cylinder $A^2$. By properly proportioning the distances between the trunnions Y and pivots $Y^5$ and between the trunnions Y and pivots $Y^7$, it will be obvious that the mold support can be raised off the striking face $B^3$ of the anvil on the application of any suitable weight to the free end of the treadle $Y^2$. When a weight, as the weight of the operator standing on the free end of the treadle $Y^2$, is applied to the treadle, the mold support is raised and the anvil is lowered, and when this weight is removed the mold support falls and the anvil rises with a relative velocity dependent on the weights of the mold support and the anvil and the weight required to separate them, and that the anvil will have the necessary upward velocity at the instant of impact to substantially minimize the shock of collision with the base member E. In order to permit the mold support and anvil to be supported without requiring too great an expenditure of power, and in order also to avoid the transmission of too great a portion of the shock of collision to the base member E, through the trunnions Y, with varying loads, provision should be made for obtaining the proper leverage with varying loads. This may be accomplished as shown by providing slots $Y^9$ in the levers $Y'$ through which the bolts $Y^7$ pass, and in which the bolts may be adjustably secured to the levers $Y'$ at the desired distance from the trunnions Y.

In some cases a resilient cushion, which is formed in part by springs and in part by compressed air or other elastic fluid under pressure, may be used with good results in the varying types of jar molding machines in which a resilient cushion is advantageous, and in Fig. 11 I have shown one arrangement of this kind. In the machine shown in Fig. 11 the anvil B is in part supported by springs Q, as in the construction shown in Fig. 4, but these springs are not designed to take the entire load of the anvil, mold support and the weight supported by the latter. On the contrary, the springs are so chosen that they will support the anvil and mold support when no load is on the latter at the desired lower level, and provisions comprising the pipes F, F' and $F^2$, and the pipe J, connected to a suitable source of air under pressure, valves G and G', lever H, arm I, and cam lug $I^3$ are employed as in Fig. 1 to admit air under pressure to the cylinder space $E'$ when the anvil moves below the desired lower level. In consequence, air is admitted to the space $e$ to balance the varying load put on the mold support. The resilient cushion, thus formed, partly by the springs Q and partly by the air under pressure in the space $e$, gives the desired upward velocity to the anvil at the instant of impact, while the balancing of the anvil takes less air and requires air of less pressure, than the machine shown in Fig. 1. On the other hand, this form of apparatus possesses an advantage over such apparatus as is shown in Fig. 4, or in the other figures in which a spring cushion is employed, from the fact that the lower level of the anvil is not altered with varying loads on the mold support.

While, in accordance with the provisions of the statutes, I have hereinbefore described and illustrated the best forms of my invention now known to me, it will be obvious to those skilled in the art that the invention may be embodied in many different forms of apparatus other than those described and illustrated. It will also be apparent to those skilled in the art that certain features of the invention may be used to advantage under certain conditions without a corresponding use of other features of the invention, and I do not wish the claims hereinafter made to be limited to the embodiments disclosed more than is made necessary by the state of the art.

No claim is made herein to the provisions shown for retarding the falling movement of the mold support in order to insure that the mold forming material shall bear firmly against the patterns throughout the falling movement. On the contrary, it is my intention to claim such provisions in a separate application which I am about to file.

Having now described my invention, what I claim as new, and desire to secure by Letters Patent, is:

1. In a jar molding machine, a movable mold support, a movable anvil, and means for moving said anvil and mold support each toward the other with such velocities that the anvil has a substantial momentum opposite in direction to the momentum of the mold support at the instant of impact.

2. In a jar molding machine, the combination with an anvil, of a mold support which is alternately lifted off and allowed to drop back on to the anvil, and means for giving the anvil an upward movement when the mold support is dropped such that the anvil has a substantial momentum in the opposite direction to the momentum of the mold support at the instant of impact.

3. In a jar molding machine, the combination with a relatively movable mold support and anvil, of means providing a resilient support for the anvil adapted to give the anvil a movement toward the mold support while the latter is moving toward the anvil such that the anvil has a substantial momentum opposite in direction to the momentum of the mold support at the instant of impact.

4. In a jar molding machine, the combination with a stationary base member, a movable anvil member, one of said members having a cylinder and the other a piston working in said cylinder, a mold support, means for alternately lifting the mold support off the anvil and allowing it to drop back into engagement with the anvil, and means for maintaining a cushion of compressed air in said cylinder tending to move the anvil upward when the weight of the mold support and its load is taken off the anvil.

5. In a jar molding machine, the combination with a stationary base member, a movable anvil member, one of said members having a cylinder and the other a piston working in said cylinder, a mold support, means for alternately lifting the mold support off the anvil and allowing it to drop back into engagement with the anvil, and means actuated by said anvil on its changes in position relative to the base member for admitting air under pressure to said cylinder to check further downward movement of said anvil after the latter moves down to a certain level.

6. In a jar molding machine, the combination with a stationary base member, a movable anvil member, one of said members having a cylinder and the other a piston working in said cylinder, a mold support, means for alternately lifting the mold support off the anvil and allowing it to drop back into engagement with the anvil, and means actuated by said anvil on its changes in position relative to the base member for admitting air under pressure to said cylinder sufficient to float said anvil and the weight of the mold support and its load when the anvil moves below a certain level, and for permitting air to escape from the cylinder when the anvil reaches a certain level above the first mentioned level.

7. In a jar molding machine, a vertically movable anvil, a vertically movable mold support mounted on said anvil, means for exerting an upwardly acting force on the mold support, the reaction of which is taken by the anvil to lift the mold support above the anvil preparatory to collision, and means providing a resilient cushion for the anvil adapted to give the latter an upward movement while the mold support is falling, which continues until collision occurs.

8. In a jar molding machine, a vertically movable anvil, a vertically movable mold support mounted on said anvil, means for exerting an upwardly acting force on the mold support, the reaction of which is taken by the anvil to lift the mold support above the anvil preparatory to collision, and means providing a resilient supporting cushion for the anvil adapted to sustain the anvil and mold support at a level below, and to sustain the anvil when freed from the weight of the mold support at a level above, the level at which collision occurs in normal operation.

9. In a jar molding machine, a vertically movable anvil member, a mold support member, one of said members being provided with a vertical piston and the other with a coöperating cylinder into which fluid under pressure is admitted and from which it is permitted to exhaust to produce alternate separations of, and collisions between, the mold support and anvil members, and means providing a resilient cushion for the anvil adapted to give the latter an upward movement while the mold support is falling which continues until collision takes place.

10. In a jar molding machine, a vertically movable anvil member, a mold support member, one of said members being provided with a vertical piston and the other with a coöperating cylinder into which fluid under pressure is admitted and from which it is permitted to exhaust to produce alternate separations of, and collisions between the mold support and anvil members, and means providing a resilient supporting cushion for the anvil adapted to sustain the anvil and mold support at a level below, and to sustain the anvil when freed from the weight of the mold support at a level above, the level at which collision occurs in normal operation.

11. In a jar molding machine, a base provided with an upstanding guide, an anvil vertically movable along said guide and provided at its upper end with an upstanding piston, a mold support provided with a hollow cylinder into which said piston enters, means for admitting fluid under pressure to, and permitting it to exhaust from, the space in said cylinder above the piston in order to produce alternate separations of and collisions between the mold support and anvil, and means providing a resilient cushion between the base and the anvil adapted to sustain the mold support and anvil at a level below, and to sustain the anvil when freed from the weight of the mold support above, the level at which collision occurs in normal operation.

WILFRED LEWIS.

Witnesses:
ARNOLD KATZ,
D. STEWART.